US011468186B2

(12) United States Patent
Dong et al.

(10) Patent No.: US 11,468,186 B2
(45) Date of Patent: Oct. 11, 2022

(54) DATA PROTECTION VIA AGGREGATION-BASED OBFUSCATION

(71) Applicant: EQUIFAX INC., Atlanta, GA (US)

(72) Inventors: Rongrong Dong, Suwanee, GA (US); Michael McBurnett, Cumming, GA (US); Nikhil Paradkar, Atlanta, GA (US)

(73) Assignee: EQUIFAX INC., Atlanta, GA (US)

( * ) Notice: Subject to any disclaimer, the term of this patent is extended or adjusted under 35 U.S.C. 154(b) by 7 days.

(21) Appl. No.: 16/760,033

(22) PCT Filed: Oct. 28, 2018

(86) PCT No.: PCT/US2018/057965
§ 371 (c)(1),
(2) Date: Apr. 28, 2020

(87) PCT Pub. No.: WO2019/089439
PCT Pub. Date: May 9, 2019

(65) Prior Publication Data
US 2020/0265155 A1     Aug. 20, 2020

Related U.S. Application Data

(60) Provisional application No. 62/578,880, filed on Oct. 30, 2017.

(51) Int. Cl.
*G06F 21/62* (2013.01)
(52) U.S. Cl.
CPC ................. *G06F 21/6218* (2013.01)
(58) Field of Classification Search
USPC .......................................................... 707/781
See application file for complete search history.

(56) References Cited

U.S. PATENT DOCUMENTS 8,560,785 B1 * 10/2013 Malhotra ............ G06F 21/6218
711/162
9,928,379 B1 * 3/2018 Hoffer ..................... G16H 50/70
(Continued)

FOREIGN PATENT DOCUMENTS

WO     2014031041 A1     2/2014

OTHER PUBLICATIONS

PCT/US2018/057965, "International Search Report and Written Opinion", dated Mar. 8, 2019, 10 pages.
(Continued)

*Primary Examiner* — Tamara T Kyle
*Assistant Examiner* — Raheem Hoffler
(74) *Attorney, Agent, or Firm* — Kilpatrick Townsend & Stockton LLP

(57) ABSTRACT

In some aspects, a computing system can obfuscate sensitive data based on data aggregation. A sensitive database containing sensitive data records can be joined with a grouping database containing a group identifier. The joining can be performed through a linking key that links a sensitive data record with a grouping data record in the grouping database. A grouping identifier can thus be obtained for each of the sensitive data record. The sensitive data records can be aggregated into aggregation groups based on their respective values of the group identifier. Statistics are calculated for the sensitive attributes of the sensitive data records in each aggregation group and are included in the aggregated data as the obfuscated version of the sensitive data. The aggregated data can be utilized to serve data queries from entities authorized or unauthorized to access the sensitive data.

20 Claims, 6 Drawing Sheets

(56) References Cited

U.S. PATENT DOCUMENTS

| | | | |
|---|---|---|---|
| 10,628,604 B1* | 4/2020 | Thackston | G06F 21/6227 |
| 2005/0138110 A1* | 6/2005 | Redlich | G06F 21/6254 |
| | | | 709/201 |
| 2007/0192140 A1* | 8/2007 | Gropper | G06F 21/6245 |
| | | | 715/205 |
| 2008/0118150 A1 | 5/2008 | Balakrishnan et al. | |
| 2008/0208914 A1* | 8/2008 | Navani | G16H 10/60 |
| 2009/0150362 A1 | 6/2009 | Evenhaim | |
| 2010/0114920 A1* | 5/2010 | Srivastava | G06F 16/2462 |
| | | | 707/757 |
| 2011/0277037 A1 | 11/2011 | Burke et al. | |
| 2013/0152158 A1* | 6/2013 | Yoshihama | G06F 21/6245 |
| | | | 726/1 |
| 2015/0059003 A1* | 2/2015 | Bouse | G06F 16/2228 |
| | | | 726/28 |
| 2015/0161397 A1* | 6/2015 | Cook | G06F 21/6254 |
| | | | 726/26 |
| 2015/0199699 A1* | 7/2015 | Milton | G06Q 30/0205 |
| | | | 705/7.34 |
| 2015/0262207 A1* | 9/2015 | Rao | G06Q 30/0241 |
| | | | 705/7.32 |
| 2015/0324607 A1 | 11/2015 | Mushkatblat et al. | |
| 2016/0283745 A1* | 9/2016 | LaFever | G06F 21/6254 |
| 2017/0169253 A1 | 6/2017 | Curcio et al. | |
| 2018/0096102 A1* | 4/2018 | Akinmeji | G06F 16/2455 |
| 2018/0232528 A1* | 8/2018 | Williamson | G06F 16/285 |
| 2018/0350180 A1* | 12/2018 | Onischuk | G07C 13/00 |
| 2019/0166102 A1* | 5/2019 | Chizi | G06F 21/6245 |

OTHER PUBLICATIONS

EP18873874.4, "Extended European Search Report", dated Jun. 22, 2021, 6 pages.

* cited by examiner

DATA PROTECTION VIA AGGREGATION-BASED OBFUSCATION

CROSS REFERENCE TO RELATED APPLICATIONS

This application claims priority to U.S. Provisional Application No. 62/578,880, entitled "Data Aggregation by Multi-Computing Process Distribution," filed on Oct. 30, 2017, which is hereby incorporated in its entirety by this reference.

TECHNICAL FIELD

The present disclosure relates generally to data integrity and protection. More specifically, but not by way of limitation, this disclosure relates to facilitating secure queries and other use of stored data via aggregation-based data obfuscation.

BACKGROUND

Protecting data from unauthorized access is an important aspect of computer security, especially in the Internet age. As network connections become ubiquitous, more and more data and services are stored and provided online so that the data and services can be accessed instantly and conveniently. However, maintaining the security of this data is often difficult, if not impossible, when using a computing system that is connected to the Internet. Sensitive data, such as data containing identity information about individuals like customers or patients, are one of the major targets of the cyberattacks where attackers try to access, copy, or even modify the sensitive data stored on a computer.

SUMMARY

Various embodiments of the present disclosure provide systems and methods for data protection using obfuscation based on data aggregation. A query can be received from a client computing device for a sensitive database stored in a secured storage device that the client computing device is unauthorized to access. The sensitive database can include multiple sensitive data records and each of the sensitive data records has one or more sensitive attributes. A data aggregation module can identify a linking key in the sensitive database to associate the sensitive database with a grouping database that includes a field for a grouping identifier. The data aggregation module can join the sensitive database with the grouping database through the linking key.

The data aggregation module compresses the sensitive database by aggregating the sensitive data records into aggregation groups based on the grouping identifier. An aggregated database can be generated by calculating statistics for the one or more sensitive attributes of sensitive data records in each of the aggregation groups. The data aggregation module can insert a trace link field in the aggregated database linking aggregated data records of the aggregated database to the corresponding sensitive data records in the sensitive database. The aggregated database can be utilized to serve the query and be made accessible by the client computing device.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

DETAILED DESCRIPTION

Figure 1:
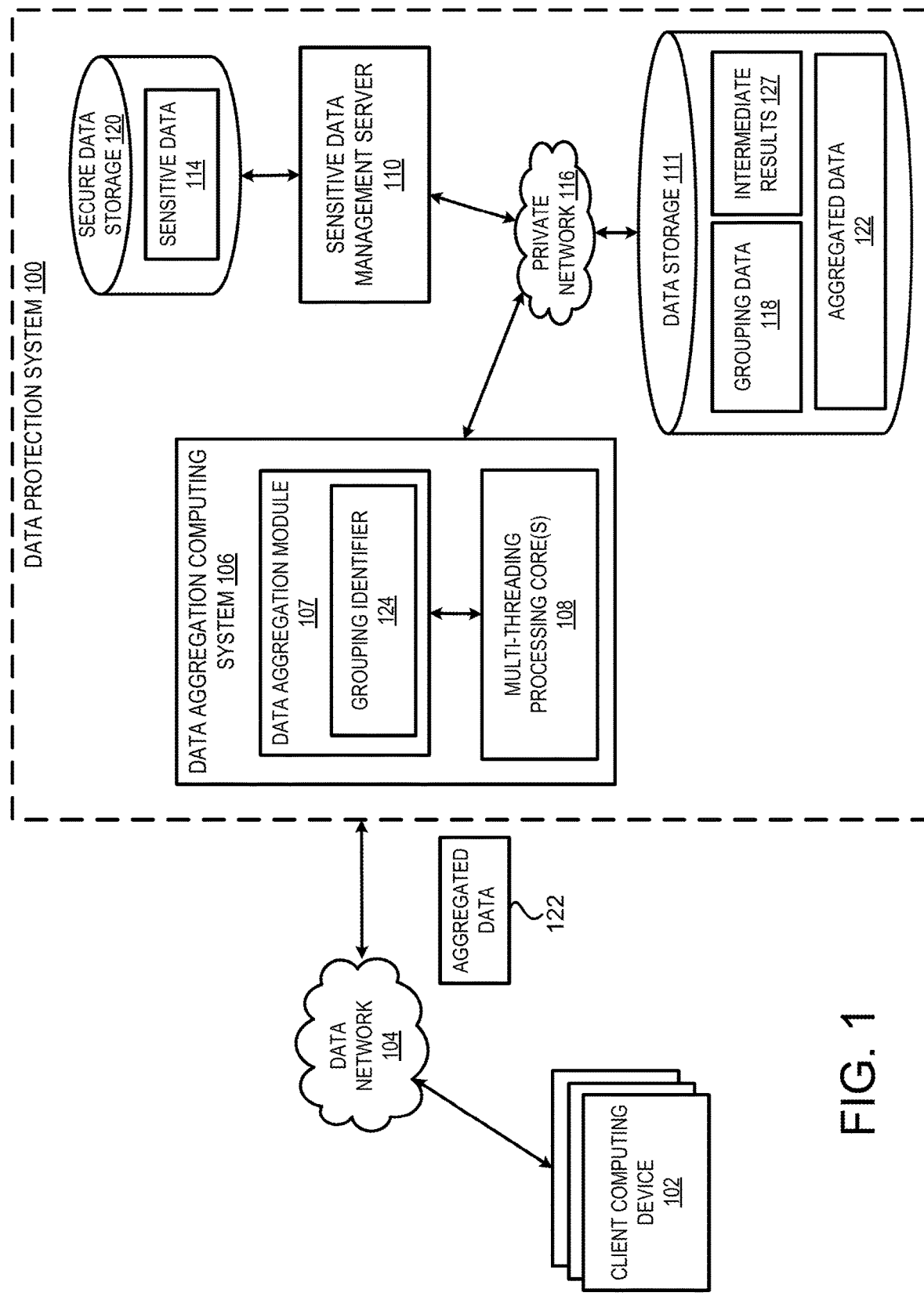
FIG. 1 is a block diagram depicting an example of a computing environment in which sensitive data can be protected though aggregation-based obfuscation according to certain aspects of the present disclosure.

Certain aspects of this disclosure describe protecting sensitive data via aggregation-based data obfuscation. A grouping identifier can be added to or otherwise associated with sensitive data records. The obfuscation can be performed by aggregating sensitive data based on the associated grouping identifier. The grouping identifier can be selected such that the difference between the values of the grouping identifier associated with two sensitive data records reflects the difference between the two sensitive data records. In other words, if two sensitive data records are similar, the values of the grouping identifier are also similar so that they are grouped into a same aggregation group. On the other hand, if two sensitive data records are distinct, the values of the grouping identifier are also different so that these two sensitive data records will be grouped into two different aggregation groups. As a result, aggregated data records generated based on the grouping identifier do not significantly deviate from the sensitive data records. The aggregated data can therefore provide enhanced security while remaining suitable for purposes such as model building and training and other operations.

The aggregation can be performed by organizing sensitive data records into aggregation groups based on the values of the grouping identifier. In some aspects, where one value of grouping identifier corresponds to a sufficient number of sensitive data records, the data records corresponding to the specific value of the grouping identifier can be organized as one aggregation group. In additional or alternative aspects, where one value of grouping identifier corresponds to an insufficient number of sensitive data records, sensitive data records corresponding to multiple values of the grouping identifier can be organized into one aggregation group. Statistics for each of the sensitive attributes of the data records in an aggregation group can be calculated and stored in an aggregated data record.

In some aspects, the aggregated data do not deviate greatly from the sensitive data. If so, the aggregated data can be utilized to offer rapid access of the data by requesting entities. The sensitive data, on the other hand, can be stored in a highly secured environment, such as with high complexity encryption mechanism, within a highly secured network environment, or even be taken offline when necessary. This significantly reduces the risk of the sensitive data being attacked and compromised through cyberattacks without much impact on the accessibility of the data. In addition, the aggregated data have a size smaller than the sensitive data. Transmitting and processing the aggregated data can reduce the consumption of network bandwidth and computing resources, such as CPU time and memory space. Furthermore, by obfuscating the sensitive data through aggregation, more data can be made available to entities that otherwise do not have authorization to access the sensitive data. These data can be valuable in applications such as data analysis, building and training analysis models where the accuracy of the analysis and the model can be increased due to more data offered through the obfuscation.

Data aggregation becomes challenging for sensitive data having massive amount of data records. To increase the speed of the data aggregation, the computing processes can include multi-threading, multiple processing core allocation or both. Controlled processing distribution can enable efficiency in the use of voluminous and complex data, for example, census data. For example, if the sensitive data include individual information, census blocks can be used as the grouping identifier to facilitate the aggregation. The grouping processes can include a process for grouping census blocks with an insufficient number of people into aggregation groups. This process can be implemented by multi-threading, multiple processing core allocation, or both. A process for census blocks with a sufficient number of people is less computationally intense, and thus can optionally be allocated to a single thread or a single core. Employing multi-threading and/or multiple processing core allocation can significantly speed up the data aggregation process ensuring the generated aggregated data to be generated accurately.

These illustrative examples are given to introduce the reader to the general subject matter discussed here and are not intended to limit the scope of the disclosed concepts. The following sections describe various additional features and examples with reference to the drawings in which like numerals indicate like elements, but should not be used to limit the present disclosure.

Example of an Operating Environment

Referring now to the drawings, FIG. 1 depicts an example of a data protection system 100 that can provide data protection through aggregation-based data obfuscation. FIG. 1 depicts examples of hardware components according to some aspects. The data protection system 100 is a specialized computing system that may be used for processing large amounts of data using a large number of computer processing cycles. The data protection system 100 may include a data aggregation computing system 106 which may be a specialized computer, server or other machine that processes data received or stored within the data protection system 100. The data aggregation computing system 106 may include one or more other systems. For example, the data aggregation computing system 106 may include a database system for accessing network-attached data stores, a communications grid, or both. A communications grid may be a grid-based computing system for processing large amounts of data. The data protection system 100 may also include network-attached data storage 111 for storing a grouping database containing grouping data 118, an aggregated database containing aggregated data 122, and intermediate results 127, which can include results of each of multiple computing processes as discussed herein. In some aspects, the network-attached data storage can also store any intermediate or final data generated by one or more components of the data protection system 100.

In the example of FIG. 1, data protection system 100 also includes a secure data storage 120 for storing sensitive data 114 in a sensitive database. The sensitive database may contain sensitive data that are protected against unauthorized disclosure. Protection of sensitive data may be required for legal reasons, for issues related to personal privacy or for proprietary considerations. For example, the sensitive data may contain regulated data. The regulated data can include credit information for specific persons, and may include government identification numbers, a customer identifier for each person, addresses, and credit attributes such as mortgage or other loan attributes. Such information is referred to as "regulated" because the distribution and use of this information is restricted by law. As an example, if an institution uses regulated information to market a credit product, the marketing must take the form of a firm offer of credit. The sensitive data may also include linking keys for individual credit files.

Through obfuscation, sensitive data can be transformed into non-sensitive data, such as aggregated data. For example, aggregated data 122 can be generated by combining individual sensitive attributes in the sensitive data 114 beyond the point where information about specific sensitive data record can be obtained from the combined data. To achieve this, a data aggregation module 107 can be employed by the data aggregation computing system 106 to perform the aggregation operations. For example, the data aggregation module 107 can select and associate a grouping identifier 124 with the sensitive data 114, for example, by identifying or adding a linking key to the sensitive database that links the sensitive data records to grouping data 118 stored in the data storage 111 that contain the grouping identifier. For example, if the selected group identifier 124 includes census block an individual person belongs to, the linking key can include the identifier of individuals, such as a user ID or a customer ID. The grouping data 118 can include location or address information for the individuals and the corresponding census block information determined based on the location or address information. The sensitive data 114 can be aggregated based on the grouping data 118 and the generated data can be saved as the aggregated data 122 in an aggregated databased on the data storage 111. Because the aggregated data 122 have been obfuscated and no longer contain information that is specific to any of the individuals, the aggregated data 122 are not subject to the same restrictions as the sensitive data 114. In the above example involving regulated data, the aggregated data 122 can be referred to as "unregulated" data, and institutions can use unregulated data more freely to market products, for example, to generate mere invitations to apply for a credit product.

The data aggregation computing system 106 can include one or more processing devices that execute program code. In some aspects, these processing devices include multi-threading-capable processors that are implemented in multiple processing cores 108. The program code, which is stored on a non-transitory computer-readable medium, can include the data aggregation module 107. The data aggregation module 107 can perform the aggregation process described herein by distributing the task among multiple computing processes on the multiple cores and/or the multiple threads of a process. The output of each computing process can be stored as intermediate results 127 on the data storage 111. The intermediate results 127 can be aggregated into the aggregated data 122 if the processing of all the threads or processes are complete.

The sensitive data 114 can be stored in the secure data storage 120 in a highly secured manner. For example, the sensitive data 114 can be encrypted using high complexity encryption operation, increasing the difficulty posed to attackers that seek to access the plain sensitive data 114. In addition, the sensitive data 114 can be stored in an isolated network environment that is accessible only through a sensitive data management server 110. The sensitive data management server 110 may be a specialized computer, server or other machine that is configured to manage the encryption, decryption and access of the sensitive data 114. A request to the sensitive data 114 is received at the sensitive data management server 110 that may perform authentication to determine the identity of the requesting entity, such as through the credentials of the requesting entity, and/or the authority associated with the requesting entity regarding accessing the sensitive data 114. The sensitive data management server 110 may also configure to set the sensitive database offline from time to time to further reduce the risk of the sensitive data 114 being compromised through cyber-attacks via network.

Furthermore, the sensitive data management server 110, the data aggregation computing system 106 and the data storage 111 can communicate with each other via a private network 116. In some aspects, by using the private network 116, the aggregated database stored in the repository 122 can also be stored in an isolated network (i.e., the private network 116) that has no direct accessibility via the Internet or another public data network 104.

One or more entities can transmit requests for data using one or more client computing devices 102. A client computing device 102 may be a server computer, a personal computer ("PC"), a desktop workstation, a laptop, a notebook, a smartphone, a wearable computing device, or any other computing device capable of connecting to the data network 104 and communicating with the data aggregation computing system 106 or other systems in the data protection system 100. The data network 104 may be a local-area network ("LAN"), a wide-area network ("WAN"), the Internet, or any other networking topology known in the art that connects the client computing device 102 to the data protection system 100. The data networks 104 can be incorporated entirely within (or can include) an intranet, an extranet, or a combination thereof.

The data protection system 100 can send the aggregated data 122 in response to the data request from the client computing device 102. In some aspects, even if the requesting entity is not authorized to access the sensitive data 114, the requesting entity may receive the aggregated data 122 because the aggregated data 122 no longer contain sensitive information that is specific to any individual sensitive data record. The aggregated data 122 may be generated in response to receiving the request. Alternatively, or additionally, the aggregated data 122 may be generated and stored in the data storage 111 and utilized to serve the requests as they are received.

If a requesting entity determines that the received aggregated data 122 are insufficient, the requesting entity can request for the sensitive data 114, or at least a portion thereof, if the requesting entity is authorized to access the sensitive data 114. In such a scenario, the data protection system 100 can forward the request along with the credentials of the requesting entity to the sensitive data management server 110 to retrieve the sensitive data 114.

Network-attached data stores used in the data protection system 100 may also store a variety of different types of data organized in a variety of different ways and from a variety of different sources. For example, network-attached data stores may include storage other than primary storage located within the data aggregation computing system 106 that is directly accessible by processors located therein. Network-attached data stores may include secondary, tertiary, or auxiliary storage, such as large hard drives, servers, virtual memory, among other types. Storage devices may include portable or non-portable storage devices, optical storage devices, and various other mediums capable of storing, or containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as compact disk or digital versatile disk, flash memory, memory or memory devices.

The numbers of devices depicted in FIG. 1 are provided for illustrative purposes. Different numbers of devices may be used. For example, while each device, server, and system in FIG. 1 is shown as a single device, multiple devices may instead be used. Also, devices and entities may be combined or partially combined. For example, the data aggregation computing system 106 and the data storage 111 may overlap or reside on a single server. Each communication within the data protection system 100 may occur over one or more data networks 116, which may include one or more of a variety of different types of networks, including a wireless network, a wired network, or a combination of a wired and wireless network. A wireless network may include a wireless interface or combination of wireless interfaces. A wired network may include a wired interface. The wired or wireless networks may be implemented using routers, access points, bridges, gateways, or the like, to connect devices in the private network 116.

Figure 2:
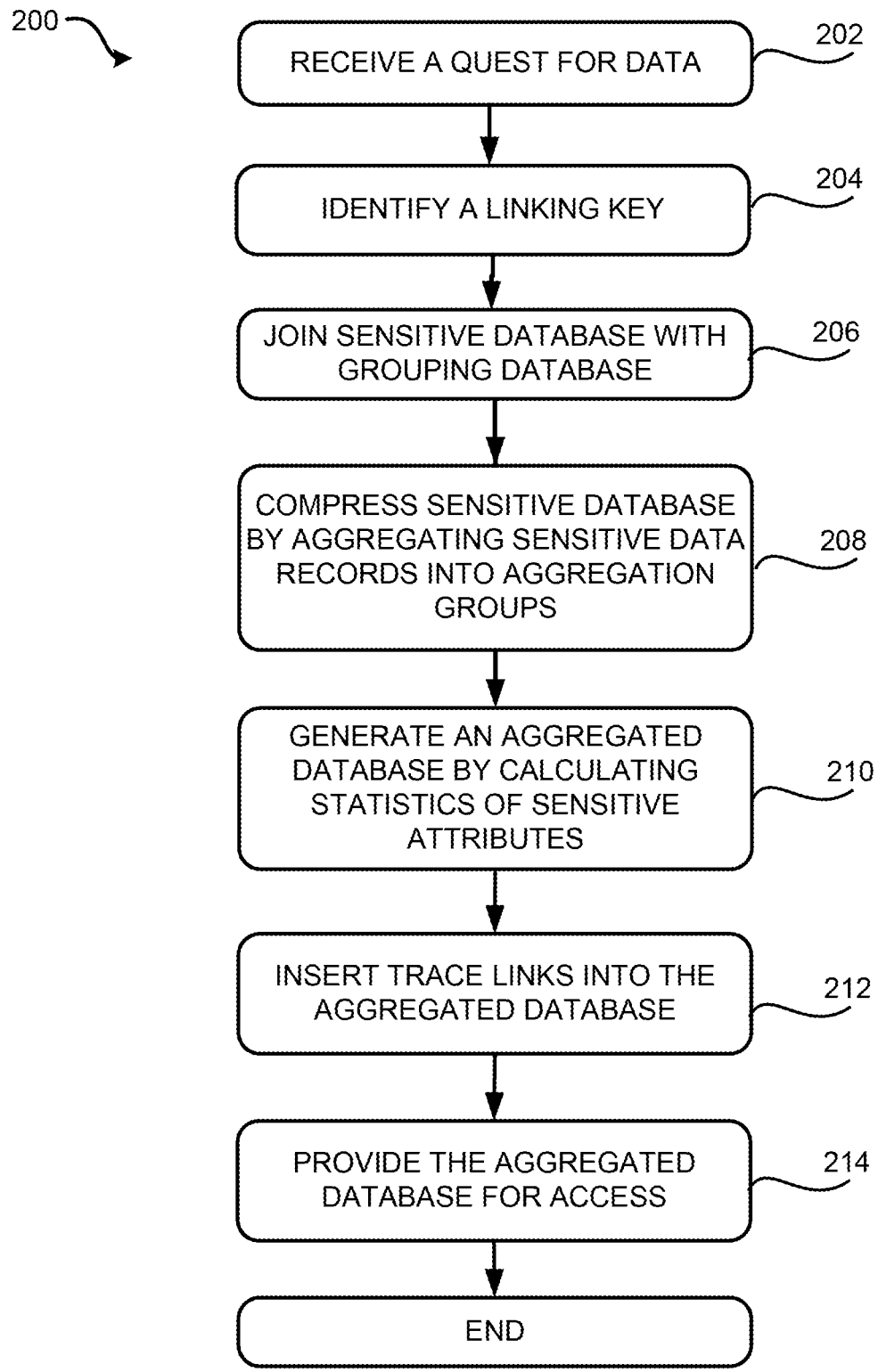
FIG. 2 is a flow chart depicting an example of a process for utilizing data aggregation to obfuscate sensitive data to satisfy data requests according to certain aspects of the present disclosure.

Examples of Computer-Implemented Operations for Data Obfuscation Based on Aggregation FIG. 2 is a flow chart depicting an example of a process 200 for utilizing data aggregation to obfuscate sensitive data to satisfy data requests. One or more computing devices (e.g., the data protection system 100 or, more specifically, the data aggregation computing system 106) implement operations depicted in FIG. 2 by executing suitable program code (e.g., the data aggregation module 107). For illustrative purposes, the process 200 is described with reference to certain examples depicted in the figures. Other implementations, however, are possible.

At block 202, the process 200 involves receiving a request for data from a client computing device associated with a requesting entity. The request can include an identification of the data requested or a search query requesting data that satisfy the search query. The requesting entity may be an entity authorized to access the sensitive data 114 or an entity that is not authorized to access the sensitive data 114 but is authorized to access the aggregated data 122.

At block 204, the process 200 involves identifying a linking key that can link the sensitive data records with grouping data records that include a grouping identifier, thereby associating the grouping identifier to the sensitive data records. The linking key can include an identifier that uniquely identify each sensitive data record, such as a user ID, customer ID or a patient ID. By associating the grouping identifier with the sensitive data records, the grouping identifier can be utilized to aggregate the sensitive data records into aggregation groups. For example, if the sensitive data 114 contains information about individual persons, the grouping identifier can include a geographical identifier, such as a census block code, and the individuals can be aggregated into groups based on their respective census block codes.

Figure 3:
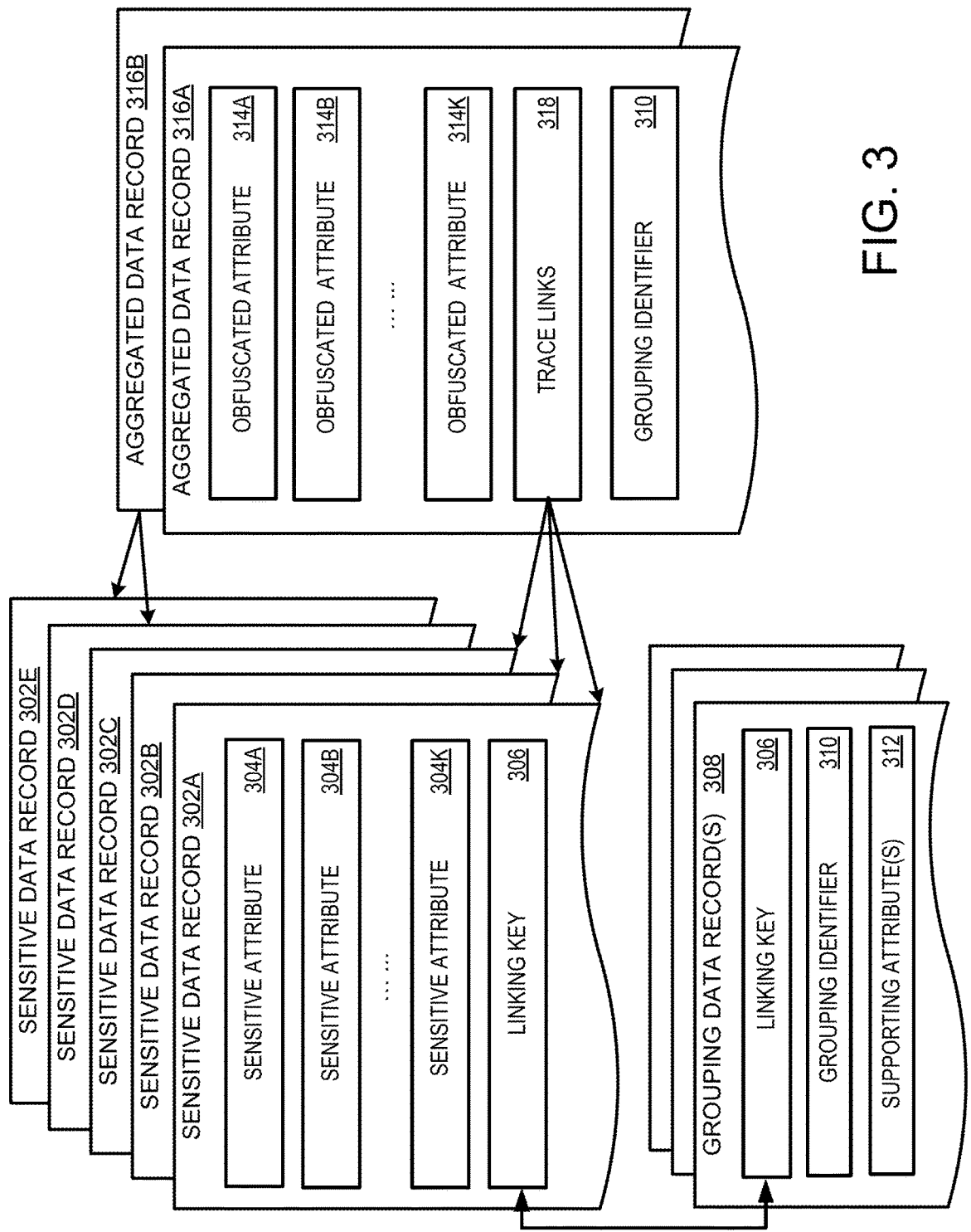
FIG. 3 is a data structure diagram illustrating the data structures for sensitive data records, grouping data records and obfuscated data records, according to certain aspects of the present disclosure.

At block 206, the process 200 involves joining the sensitive database containing the sensitive data records with the grouping database containing group data records. FIG. 3 is a data structure diagram illustrating the data structures for the sensitive database, grouping database and the joining of these two databases through a linking key. As shown in FIG. 3, a sensitive database includes multiple sensitive data records 302A-302E (which may be referred to herein individually as a sensitive data record 302 or collectively as the sensitive data records 302). Each of the sensitive data record 302 include one or more sensitive attributes 304A-304K (which may be referred to herein individually as a sensitive attribute 304 or collectively as the sensitive attributes 304). Sensitive attributes 304 can include, for example, government identification numbers, credit attributes such as mortgage or other loan attributes and so on. In addition, a sensitive data record 302 can also include a linking key 306 that can uniquely identify a sensitive data record 302.

The grouping database includes one or more grouping data records 308. A grouping data record 308 also includes the linking key 306 that links a grouping data record 308 with a sensitive data record 302 having the same value of the linking key 306. The grouping data record 308 also includes a field for the grouping identifier 310 as discussed above that can be utilized to aggregate the sensitive data records 302 into aggregation groups. In addition, the grouping data record 308 may include supporting attributes 312 that can be utilized to facilitate the aggregation process. For example, the grouping data record 308 can include a supporting attribute of standardized address for a given address of an individual. The standardized address can be utilized to determine the census block or other geographical identifier associate with an individual. Joining the sensitive database and the grouping database may include combining a sensitive data record 302 with a grouping data record 308 that has the same link key value as the sensitive data record 302. As a result, each sensitive data record has an associated value of the grouping identifier.

Referring back to FIG. 2, at block 208, the process 200 involves compressing the sensitive database by aggregating the sensitive data records into aggregation groups based on the grouping identifier. Sensitive data records associated with one value of the grouping identifier can be aggregated into one aggregation group if there are sufficient number of sensitive data records corresponding to that value of the grouping identifier. Sensitive data records associated with multiple values of the grouping identifier can be aggregated into one aggregation group if there are insufficient number of sensitive data records corresponding to one value of the grouping identifier. Compressing the sensitive database can protect the sensitive data content by obfuscating the content. Compressing the sensitive database can also reduce the size of the requested data thereby reducing the network bandwidth consumption used for transmitting the data to the client computing device and the computational resource consumption for processing the requested data at the client computing device.

At block 210, the process 200 involves generating an aggregated database that contain statistics of the sensitive data records. Specifically, the data aggregation computing system 106 can calculate the statistics for each sensitive attribute 304 of the sensitive data records in an aggregation group. The calculated statistics can be stored in an aggregated data record 316 as obfuscated attributes. FIG. 3 illustrates an example of the aggregated data records 316. In the example shown in FIG. 3, sensitive data records 302A-302C are aggregated into one aggregation group and are utilized to generate an aggregation data record 316A; sensitive data records 302D-302E are aggregated into one aggregation group and are utilized to generate an aggregation data record 316B. The obfuscated attributes 314 in the aggregated data record 316 can contain the statistics of the values of the corresponding sensitive attributes 304 in the sensitive data records 302. For example, obfuscated attribute 314A can include the statistics of the values of the sensitive attribute 304A in sensitive data records 302A-302C. The statistics can include maximum, minimum, mean, median, or other statistics of the values of the sensitive attribute. The aggregated data record 316 may also include the value(s) of the grouping identifier 310 that correspond to the aggregated data record 316.

Referring back to FIG. 2, at block 212, the process 200 involves inserting a trace link field 318 in the aggregated database so that an aggregated data record can be linked back to the sensitive data records from which the aggregated data record is generated. As shown in FIG. 3, three trace links can be added to the trace link field 318 of the aggregated data record 316A so that the sensitive data records 304A-304C can be identified from the aggregated data record 316A. Similarly, trace links can also be added to the aggregated data record 316B to identify the sensitive data records 302D-302E that are utilized to generate the aggregated data record 316B. Adding the trace links allows the corresponding sensitive data records to be retrieved by authorized entities if needed. The track links do not increase the risk of the sensitive data being compromised because by merely knowing the trace links, attackers still cannot access the sensitive content of the sensitive data records.

At block 214, the process 200 involves providing the aggregated database for access by the requesting entity. For example, the data protection system 100 can identify the requested data from the aggregated database and send the aggregated data back to the client computing device associated with the requesting entity. If the data request includes a search query, the data protection system 100 can perform the search within the aggregated database to identify data records that match the search query, and return the search results to the client computing device.

Figure 4:
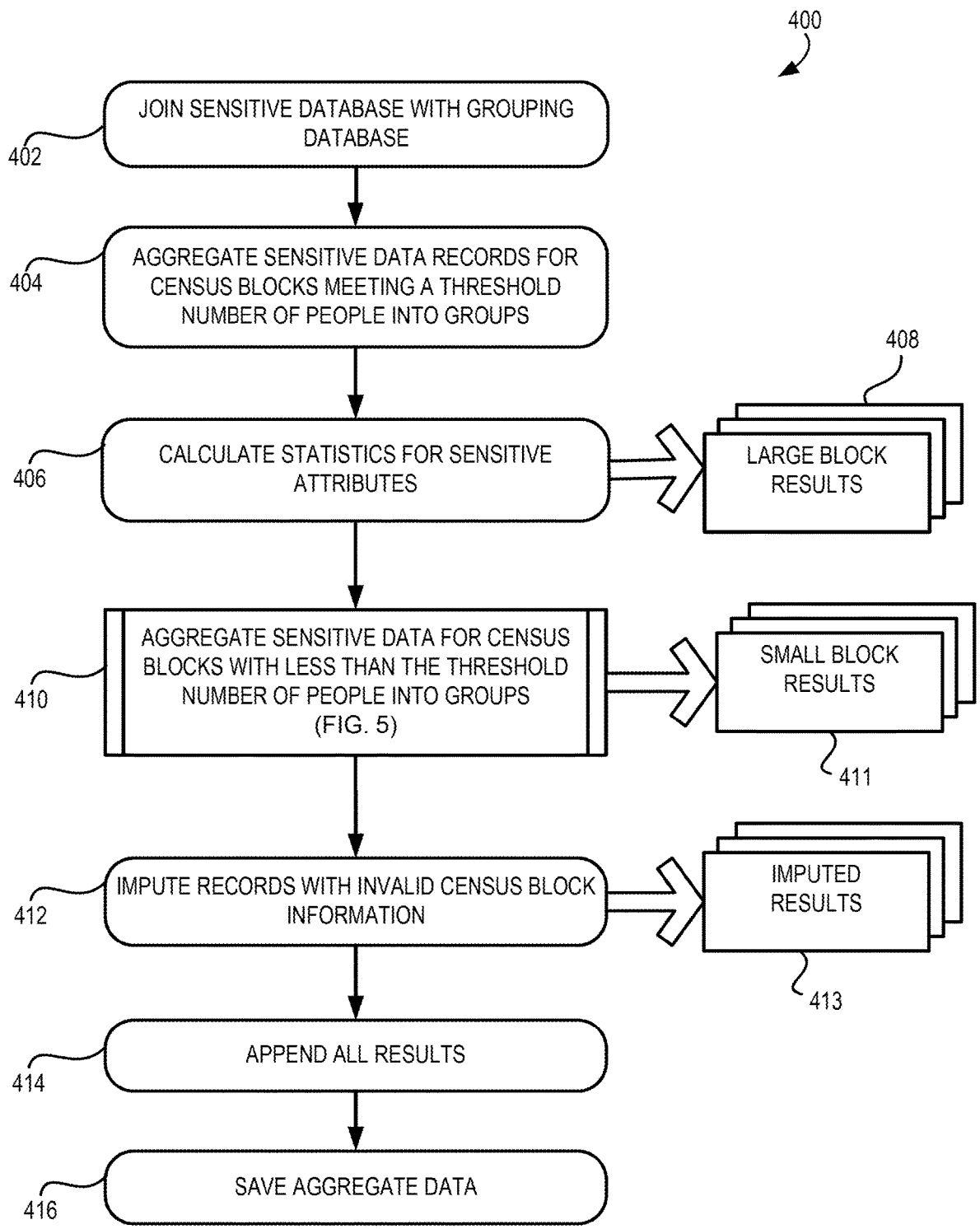
FIG. 4 is a flow chart depicting an example of a process for obfuscating sensitive data based on aggregating data according to census blocks according to certain aspects of the present disclosure.

FIG. 4 is a flowchart showing an example of a process 400 for obfuscating sensitive data by aggregating sensitive data records based on geographical information. One or more computing devices (e.g., the data protection system 100, or more specifically, the data aggregation computing system 106) implement operations depicted in FIG. 4 by executing suitable program code (e.g., the data aggregation module 107). In this particular example, the sensitive database include records for regulated data that contain sensitive attributes, also referred to as regulated attributes, for individual persons, such as credit attributes associated with the individual persons. These regulated data are aggregated using grouping identifier based on geographical data, also referred to as "geographical identifier," such as census block code. The aggregation is performed using multi-computing process distribution, or process distribution among multiple computing processes, at least one of which makes use of multi-threading, multiple processing core distribution, or both.

At block 402, the process 200 involves joining a sensitive database with a grouping database. In one example, the sensitive database is a detokenized database used for automated credit reporting. A detokenized database is a database of unencrypted data. In some aspects, sensitive personal identifiable information is encrypted when not being accessed but can be decrypted on the fly for authorized uses. The sensitive database can include customer identifiers, linking keys, and addresses.

The grouping database can be a standardized geographic database including standardized geographic attributes such as census blocks, coordinates, and standardized addresses for individuals. The standardized geographic attributes from the standardized geographic database and the regulated attributes from the sensitive database are linked by internally joining records where the geographic data records and the regulated data records intersect at a common field, i.e. the linking key. A customer identifier can be used as the linking key. Different values of the linking key can represent different individuals and a unique linking key value represents a unique person. If, for example, the goal is to obfuscate a regulated data table "R", a linking key is identified from or associated with table R so that a standardized address from the geographic database is correctly added to table R. Based on the standardized address, a census block can be determined or otherwise retrieved for each individual, and thus each sensitive data record. The link between geographic attributes and regulated attributes is established and the data aggregation occurs at the geographic level.

At block 404, the process 400 involves aggregating sensitive data records for census blocks that have the number of people meeting a threshold number. In other words, census blocks with a number of individuals equal to or exceeding a threshold number are aggregated within the same census block by the data aggregation module 107. The sensitive data records for individuals in a given census block form a given aggregation group. The threshold number can be specified as an obfuscation parameter that is input to process 400. Any threshold can be used as long as the threshold provides a sufficiently obfuscation on the sensitive data. A higher threshold can lead to a better obfuscation results on the sensitive data, but can also result in a higher computational complexity as will be discussed below. In one example, the threshold is set at seven people, which is in the range statistically sufficient to obfuscate individual regulated attributes.

At processing block 406, statistics for regulated attributes are calculated for each aggregation group by the data aggregation module 107. Statistics may include, but are not limited to, minimum, maximum, mean, and median for specific attributes. In this example, blocks 404 and 406 can be performed using a first computing process in the multi-threading processing core(s) 108. The outputs of this first computing process include large block results 408 that can be stored as part of intermediate results 127 of FIG. 1.

At block 410, the process 400 involve aggregating sensitive data records for census blocks having insufficient number of people. Specifically, census blocks with the number of people lower than the specified threshold are aggregated into groups by the data aggregation module 107. These census blocks are also referred to herein as "small census blocks." Details regarding aggregating these small census blocks are provided below with regard to FIG. 5. A second computing process can be employed for this aggregation. This second computing process processes small census blocks and forms aggregation groups using the multi-threading processing cores 108. The outputs of this second computing process include small block results 411 that can be stored as part of intermediate results 127 of FIG. 1.

At block 412, the process 400 involves imputing aggregated data to sensitive data records having invalid census block information. Records with invalid census block information include those with other than 15-digit census block code. Aggregated data, such as country-wide statistics, are imputed to these sensitive data records. A third computing process can be utilized to perform block 412. Outputs of the third computing process include the imputed results 413 which are stored as part of intermediate results 127 of FIG. 1.

At block 414, the process 400 involves appending the large block results 408, the small block results 411 and the imputed results 413 by the data aggregation module 107. At block 416, the appended results are saved as the aggregated data 122 of FIG. 1 for reference in research, marketing, and the like. A quality check can optionally be carried out. For example, the quality check can involve assessing if the above process have been performed within expectation or common sense. The quality check can include assessments such as assessing if the aggregated data include unique geographic units, or if the minimum number of people by geographic unit meets certain requirements. The quality check can also verify that the distribution among aggregated groups is within expected norms, i.e. the expectation based on history data. For example, history data might show that 95% of people are in census blocks containing greater than or equal to seven people. The quality check can verify whether that observation is still true. Deviation from the expected norms can be recorded and utilized for further analysis or for updating the expected norms.

Figure 5:
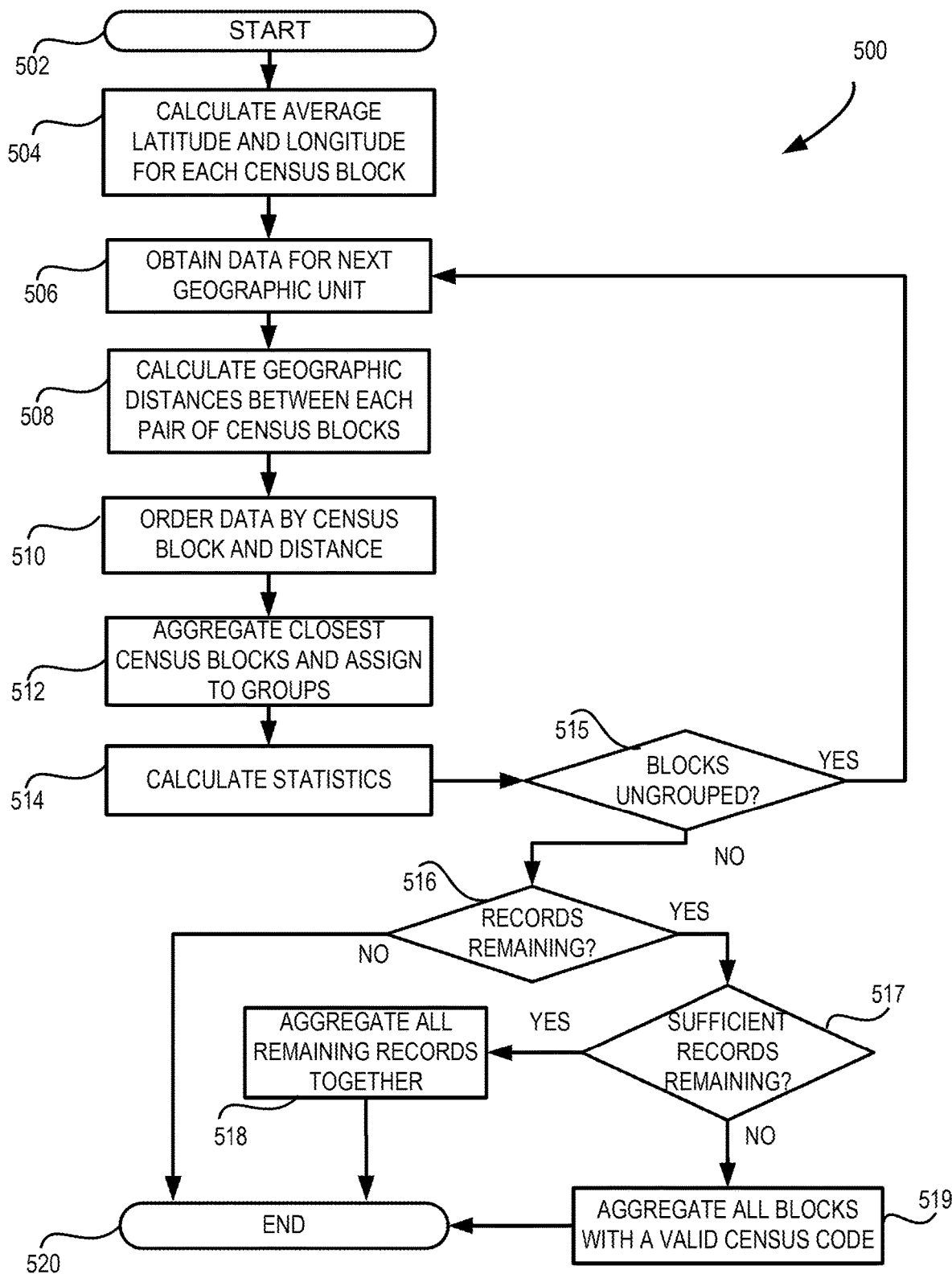
FIG. 5 is a flow chart depicting an example of a process for obfuscating sensitive data by combining multiple census blocks according to certain aspects of the present disclosure.

FIG. 5 is a flowchart illustrating a process 500 for aggregating small census blocks as described in block 410 of FIG. 4 in more detail. The process 500 starts at block 502. The process 500 can be performed by the data aggregation module 107 in the data aggregation computing system 106 utilizing the multi-threading processing cores 108. At block 504, the process 500 involves calculating the average latitude and longitude for each of the small census blocks, i.e. the census blocks with a number of people smaller than the specified threshold, e.g., seven people.

At block 506, the process 500 involves obtaining data for a next geographic unit, such as a census tract, a county (or a parish) or a state. The operations in blocks 508, 510, 512, and 514 can be repeated to aggregate small census blocks within size-varying geographic units in order to reach an acceptable level of obfuscation. In the specific example given here, processing blocks 508, 510, 512, and 514 are carried out from processing block 506 for census tracts, counties (or parishes), and states. Any suitable choice of these geographic units (or other geographic units) can be used in the process 500. The process 500 can be executed from the smallest of the chosen geographic unit and repeated as necessary for geographic units of increasing size. There can be some census blocks remained without being aggregated with others from that geographic unit. These remaining census blocks are processed within the next largest geographic unit until the blocks in the largest geographic unit are aggregated, at which point all the remaining census blocks are aggregated together.

At block 508, the process 500 involves calculating geographic distances between each pair of small census blocks. The calculation can be performed based on the average latitude and longitude of the census block calculated at block 504 of FIG. 5. At block 510, data records from the grouping database are ordered by census block and the calculated distance. At block 512, the process 500 involves aggregating the closest small census blocks into aggregation groups. The aggregation is performed such that the closest small census blocks are aggregated to meet the specified threshold, i.e., until at least seven people are included in an aggregation group if the threshold is set to seven. For remaining small census blocks, the closest ungrouped census blocks are aggregated to obtain at least seven people for the next group. This aggregation is repeated until no small census block can be aggregated with another small census block from the same geographic unit. At block 514, the process 500 involves calculating statistics for the regulated attributes in each aggregation group. As discussed above, these statistics can include minimum, maximum, mean, and median of the values of the sensitive attributes in each aggregation group.

At block 515, the process 500 involves determining if there are census blocks that have not been aggregated and if a larger geographic unit remains. If yes, the process 500 returns to block 506 to obtain data for the next larger geographic unit to perform the aggregation as described above. Otherwise, the process 500 determines at block 516 if there are regulated data records remaining. If there are no more regulated data records remaining, the process 500 ends at block 520; otherwise, the process 500 determines at block 517 if there are sufficient number of regulated data records remaining. If so, the remaining regulated data records are aggregated together at block 518. In the situation that there are insufficient number of data records remaining, all the data records with a valid census block code are aggregated at block 519. This group of people may include ones that have been used in the earlier aggregation: ones in the blocks with more than seven people and ones in the blocks with less than seven people. Some of these people may have been used in the tract, county, or state level. Some of these people are left and haven't been used in any of the earlier aggregations. In other words, the aggregation at block 519 is performed at the national level. The aggregated results are attached to each of the remaining data records as the aggregated data records. The process 500 ends at block 520.

A computationally intensive aspect of process 500 is finding the closest small census blocks and aggregating them into groups, so that each aggregation group will have enough number of sensitive data records. The process 500 can optionally be executed by a single processing core in a single thread. For a more efficient processing, process 500 for aggregating small census blocks can employ a multithreading operation, which may be implemented by the multithreading processing cores 108 of FIG. 1. For example, census blocks aggregation for geographic units, such as census tracts, can each be handled by a different thread. As such, multiple threads can be executed in parallel to aggregate sensitive data records within a county. Multithreading and/or multiple cores improves computational efficiency and delivers aggregated data 122 faster than using a single thread of a single core. Similarly, the process 500 can also be implemented with multiple processing cores. Continue the above example, small census blocks in different counties can be allocated to different processing cores. As a result, small census blocks within a state can be performed on different processing cores each running multiple threads for different census tract. In the case of multiple processing core allocation, the processes allocated to different cores are managed so that the sort order of intermediate and resultant data is correct.

Computer System Example

Figure 6:
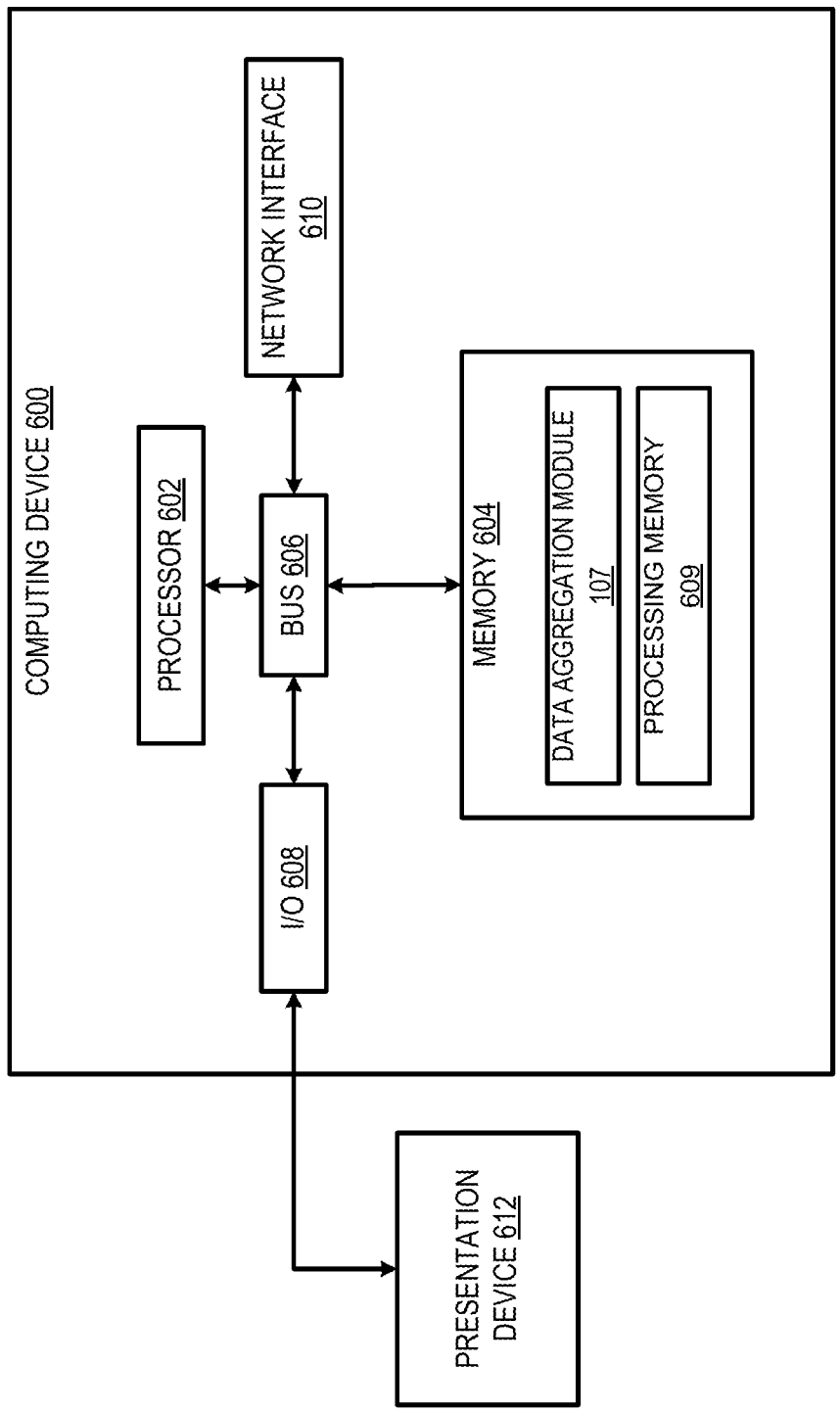
FIG. 6 is a block diagram depicting an example of a computing system suitable for implementing aspects of the techniques and technologies presented herein.

Any suitable computing system or group of computing systems can be used to perform the data obfuscation operations described herein. For example, FIG. 6 is a block diagram depicting an example of a computing device 600 that can be utilized to implement the data aggregation computing system 106. The example of the computing device 600 can include various devices for communicating with other devices in the system 100, as described with respect to FIG. 1. The computing device 600 can include various devices for performing one or more of the operations described above with respect to FIGS. 1-5.

The computing device 600 can include a processor 602 that is communicatively coupled to a memory 604. The processor 602 executes computer-executable program code stored in the memory 604, accesses information stored in the memory 604, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 602 include a microprocessor, an application-specific integrated circuit, a field-programmable gate array, or any other suitable processing device. The processor 602 can include any number of processing devices. The processor 602 can include or communicate with a memory 604. The memory 604 stores program code that, when executed by the processor 602, causes the processor to perform the operations described in this disclosure. The processor or processors can implement multiple processing cores 108 and can include multithreading capability.

The memory 604 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, a CD-ROM, DVD, ROM, RAM, an ASIC, magnetic tape or other magnetic storage, or any other medium from which a computer processor can read and execute program code. The program code may include processor-specific program code generated by a compiler or an interpreter from code written in any suitable computer-programming language.

The computing device 600 may also include a number of external or internal devices such as input or output devices. For example, the computing device 600 is shown with an input/output interface 608 that can receive input from input devices or provide output to output devices. A bus 606 can also be included in the computing device 600. The bus 606 can communicatively couple one or more components of the computing device 600.

The computing device 600 can execute program code that includes one or more of the data aggregation module 107. The program code for this module may be resident in any suitable computer-readable medium and may be executed on any suitable processing device. For example, as depicted in FIG. 6, the program code for the data aggregation module 107 can reside in the memory 604 at the computing device 600. Executing this module can configure the processor 602 to perform the operations described herein. The data aggregation module 107 can make use of processing memory 609 that is part of the memory of computing device 600.

In some aspects, the computing device 600 can include one or more output devices. One example of an output device is the network interface device 610 depicted in FIG. 6. A network interface device 610 can include any device or group of devices suitable for establishing a wired or wireless data connection to one or more data networks 104. Non-limiting examples of the network interface device 610 include an Ethernet network adapter, a modem, etc.

Another example of an output device is the presentation device 612 depicted in FIG. 6. A presentation device 612 can include any device or group of devices suitable for providing visual, auditory, or other suitable sensory output. Non-limiting examples of the presentation device 612 include a touchscreen, a monitor, a speaker, a separate mobile computing device, etc.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification that terms such as "processing," "computing," "calculating," and "determining" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The use of "configured to" herein is meant as open and inclusive language that does not foreclose devices configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

The invention claimed is:

1. A method that includes one or more processing devices performing operations comprising:
   receiving a query, from a client computing device, for a sensitive database stored in a secured storage device that the client computing device is unauthorized to access, the sensitive database comprising a plurality of sensitive data records, wherein each sensitive data record of the plurality of sensitive data records has a sensitive attribute and a linking key uniquely identifying the sensitive data record;
   identifying a grouping database comprising a plurality of grouping data records, wherein each grouping data record of the plurality of grouping data records comprises a field for a grouping identifier and a linking key configured for linking the grouping data record to a sensitive data record of the plurality of sensitive data records having a same value for the linking key;
   joining the sensitive database with the grouping database through the linking key;
   compressing the sensitive database by aggregating the plurality of sensitive data records into a plurality of aggregation groups based on the grouping identifier, a number of aggregation groups in the plurality of aggregation groups being smaller than a number of sensitive data records in the plurality of sensitive data records;
   generating an aggregated database by calculating statistics for the sensitive attribute of sensitive data records in each of the aggregation groups;
   inserting a trace link field in the aggregated database linking aggregated data records of the aggregated database to corresponding sensitive data records in the sensitive database, wherein the trace link field of an aggregated data record contains multiple trace links linking to respective multiple sensitive data records used to generate the aggregated data record; and
   causing the aggregated database to be accessible by the client computing device.

2. The method of claim 1, wherein the plurality of sensitive data records in the sensitive database corresponds to a plurality of individuals, and wherein the grouping identifier comprises a census block to which each of the plurality of individuals belongs.

3. The method of claim 2, wherein aggregating the plurality of sensitive data records into aggregation groups is performed based on the census block.

4. The method of claim 3, wherein aggregating the plurality of sensitive data records into aggregation groups comprises:
- determining that a number of individuals belonging to a census block is equal to or exceeding a threshold; and
- in response to determining that the number of individuals belonging to a census block is equal to or exceeding the threshold, aggregating sensitive data records corresponding to the individuals in the census block into an aggregation group.

5. The method of claim 4, wherein aggregating the plurality of sensitive data records into aggregation groups further comprises:
- determining that each of a plurality of census blocks within a geographical unit has a number of individuals below the threshold; and
- in response to determining that each of the plurality of census blocks has a number of individuals below the threshold, aggregating sensitive data records for the individuals in the plurality of census blocks into an aggregation group based on a total number of the individuals in the plurality of census blocks equal to or exceeding the threshold.

6. The method of claim 5, wherein aggregating the plurality of sensitive data records into aggregation groups further comprises:
- determining that ungrouped census blocks within the geographical unit having a total number of individuals below the threshold; and
- in response to determining that ungrouped census blocks within the geographical unit having a total number of individuals below the threshold, aggregating sensitive data records for individuals in the ungrouped census blocks within the geographical unit with one or more ungrouped census block within another geographical unit into an aggregation group.

7. The method of claim 3, wherein aggregating sensitive data records for the individuals into aggregation groups comprises imputing nation-wide statistics to sensitive data records in the sensitive database that are not associated with a valid census block code.

8. A system comprising:
- a processor; and
- a non-transitory computer-readable storage device comprising instructions that are executable by the processor to cause the system to perform operations comprising:
  - receiving a query, from a client computing device, for a sensitive database stored in a secured storage device that the client computing device is unauthorized to access, the sensitive database comprising a plurality of sensitive data records, wherein each sensitive data record of the plurality of sensitive data records has a sensitive attribute and a linking key uniquely identifying the sensitive data record;
  - identifying a grouping database comprising a plurality of grouping data records, wherein each grouping data record of the plurality of grouping data records comprises a field for a grouping identifier and a linking key configured for linking the grouping data record to a sensitive data record of the plurality of sensitive data records having a same value for the linking key;
  - joining the sensitive database with the grouping database through the linking key;
  - compressing the sensitive database by aggregating the plurality of sensitive data records into a plurality of aggregation groups based on the grouping identifier, a number of aggregation groups in the plurality of aggregation groups being smaller than a number of sensitive data records in the plurality of sensitive data records;
  - generating an aggregated database by calculating statistics for the sensitive attribute of sensitive data records in each of the aggregation groups;
  - inserting a trace link field in the aggregated database linking aggregated data records of the aggregated database to corresponding sensitive data records in the sensitive database, wherein the trace link field of an aggregated data record contains multiple trace links configured for linking to respective multiple sensitive data records used to generate the aggregated data record; and
  - causing the aggregated database to be accessible by the client computing device.

9. The system of claim 8, wherein the plurality of sensitive data records in the sensitive database corresponds to a plurality of individuals, wherein the grouping identifier comprises a census block that each of the plurality of individuals belongs to, and wherein aggregating the plurality of sensitive data records into aggregation groups is performed based on the census block.

10. The system of claim 9, wherein aggregating the plurality of sensitive data records into aggregation groups comprises aggregating sensitive data records corresponding to the individuals in a census block into an aggregation group based on a number of individuals belonging to the census block is equal to or exceeding a threshold.

11. The system of claim 10, wherein aggregating the plurality of sensitive data records into aggregation groups further comprises:
- determining that each of a plurality of census blocks within a geographical unit has a number of individuals below the threshold; and
- in response to determining that each of the plurality of census blocks has a number of individuals below the threshold, aggregating sensitive data records for the individuals in the plurality of census blocks into an aggregation group based on a total number of the individuals in the plurality of census blocks equal to or exceeding the threshold.

12. The system of claim 11, wherein the geographical unit comprises at least one of a census tract, a county, or a state.

13. The system of claim 11, wherein the plurality of census blocks are geographically closer to each other than other census blocks within the geographical unit that have not been aggregated.

14. The system of claim 11, wherein the processor has a plurality of processing cores and wherein aggregating sensitive data records for the individuals into aggregation groups comprises:
- allocating a process for aggregating sensitive data records corresponding to the individuals in a census block into an aggregation group to a first processing core of the plurality of processing cores; and
- allocating a process for aggregating sensitive data records for the individuals in the plurality of census blocks into an aggregation group to a second processing core of the plurality of processing cores.

15. The system of claim 14, wherein aggregating sensitive data records for the individuals into aggregation groups further comprises imputing nation-wide statistics to sensitive data records in the sensitive database that are not associated with a valid census block code using a third processing core of the plurality of processing cores.

16. A non-transitory computer-readable storage medium having program code that is executable by a processor device to cause a computing device to perform operations, the operations comprising:

receiving a query, from a client computing device, for a sensitive database stored in a secured storage device that the client computing device is unauthorized to access, the sensitive database comprising a plurality of sensitive data records, wherein each sensitive data record of the plurality of sensitive data records has a sensitive attribute and a linking key uniquely identifying the sensitive data record;

identifying a grouping database comprising a plurality of grouping data records, wherein each grouping data record of the plurality of grouping data records in the grouping database comprises a field for a grouping identifier and a linking key configured for linking the grouping data record to a sensitive data record of the plurality of sensitive data records having a same value for the linking key;

joining the sensitive database with the grouping database through the linking key;

compressing the sensitive database by aggregating the plurality of sensitive data records into a plurality of aggregation groups based on the grouping identifier, a number of aggregation groups in the plurality of aggregation groups being smaller than a number of sensitive data records in the plurality of sensitive data records;

generating an aggregated database by calculating statistics for the sensitive attribute of sensitive data records in each of the aggregation groups;

inserting a trace link field in the aggregated database linking aggregated data records of the aggregated database to corresponding sensitive data records in the sensitive database, wherein the trace link field of an aggregated data record contains multiple trace links configured for linking to respective multiple sensitive data records used to generate the aggregated data record; and causing the aggregated database to be accessible by the client computing device.

17. The non-transitory computer-readable storage medium of claim 16, wherein the plurality of sensitive data records in the sensitive database corresponds to a plurality of individuals, wherein the grouping identifier comprises a census block that each of the plurality of individuals belongs to, and wherein aggregating the plurality of sensitive data records into aggregation groups is performed based on the census block.

18. The non-transitory computer-readable storage medium of claim 17, wherein aggregating the plurality of sensitive data records into aggregation groups comprises aggregating sensitive data records corresponding to the individuals in a census block into an aggregation group based on a number of individuals belonging to the census block is equal to or exceeding a threshold.

19. The non-transitory computer-readable storage medium of claim 18, wherein aggregating the plurality of sensitive data records into aggregation groups further comprises:

determining that each of a plurality of census blocks within a geographical unit has a number of individuals below the threshold; and in response to determining that each of the plurality of census blocks has a number of individuals below the threshold, aggregating sensitive data records for the individuals in the plurality of census blocks into an aggregation group based on a total number of the individuals in the plurality of census blocks equal to or exceeding the threshold.

20. The non-transitory computer-readable storage medium of claim 17, wherein aggregating sensitive data records for the individuals into aggregation groups comprises imputing nation-wide statistics to sensitive data records in the sensitive database that are not associated with a valid census block code.

* * * * *